J. W. Masury,
Vessels for Packing Liquids,
No. 58,272. Patented Sept. 25, 1866
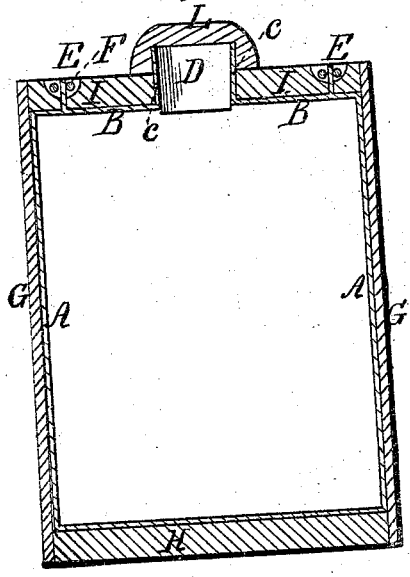
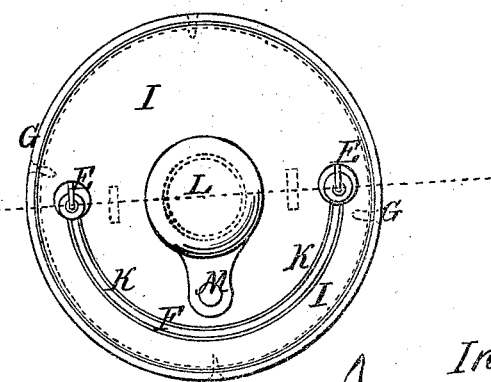
Witnesses
Wm E Lyon
Wm Frewen
Inventor
J. W. Masury
By Munn & Co
Attorneys

UNITED STATES PATENT OFFICE.

JOHN W. MASURY, OF BROOKLYN, NEW YORK.

IMPROVEMENT IN PACKING VESSELS FOR PETROLEUM.

Specification forming part of Letters Patent No. 58,272, dated September 25, 1866.

*To all whom it may concern:*

Be it known that I, JOHN W. MASURY, of Brooklyn, in the county of Kings and State of New York, have invented a new and useful Improvement in Packing of Vessels for Containing Benzine, Petroleum, or other Liquids and Materials; and I do hereby declare that the following is a full, clear, and exact description thereof, which will enable others skilled in the art to make and use the same, reference being had to the accompanying drawings, forming part of this specification.

The nature of the present invention consists in the combination of a cylindrical or other suitably-shaped wooden box or casing with a tight metallic vessel, in such a manner that the liquid or other contents of the vessel may be discharged either wholly therefrom or in any desired quantities without removing the vessel from its said casing, and without in any way materially changing the form of or injuring the box.

To enable others skilled in the art to make and use the same, I will now proceed to describe in detail its construction and operation.

Figure 1 is a view of the top of the box, and Fig. 2 a central vertical section of the same, taken in the plane of the line $x\,x$, Fig. 1.

A in the drawings represents the metallic vessel, made of a cylindrical or other suitable shape, and of any of the ordinary sheet metals, whether iron, tin, or brass, according as may be deemed most desirable or expedient. This vessel is closed at both ends, and in one of its ends or head-plates, B, at its central portion, is a short spout, C, through which the liquid or other material is placed in the same, a cork or other suitable stopper, D, being used in the same to tightly close it when so desired.

E E, two ears attached to the spout headplate B at points diametrically opposite to each other, in which ears a semicircular-shaped wire handle, F, is hung at each end, for convenience in handling or carrying the vessel. Around and about the sides of this vessel A, and entirely and closely incasing the same, but projecting a short distance beyond each end, I place a wooden covering or casing, G, the ends of which may be overlapped upon each other, and then secured together by nails, screws, or in any other proper manner, or simply brought together and then properly secured, head or end pieces H and I being placed in each of the projecting ends of the said casing and about and against the respective heads of the inner metallic vessel, and there secured to the said wooden side or casing by nails, screws, or in any other proper manner.

The head I is made in equal sections, secured by dowel-pins, suitable apertures, $x\,x\,y$, being made therein against the top plate of the vessel to allow the spout and ears of the same to project through the same, and a semicircular-shaped groove or channel, K, from one ear-aperture to the other to receive the handle when swung down and upon the same, and thus leave the top of the vessel perfectly clear and free.

Over the spout of the metallic vessel, which is made so as to project a little beyond the wooden head-plate of the outer casing when incased as above described, I place a protecting wooden or metallic cap-piece, L, cut out in its center sufficiently to sit over the said spout, which cap I secure to the top piece of the wooden casing by a screw, M, or screws, nails, or in any other proper manner; but I prefer screws, as it enables it to be detached therefrom or placed thereon at pleasure.

In lieu of constructing the wooden casing about the metallic vessel, as above explained, it may be made independent thereof, and then the vessel inserted therein, when the headplate I is then secured in the same and the handle hung to the ears of the vessel; or the head-plate may be made in two equal parts or sections, and secured as before, even when the handle is hung to the vessel, the division being in the line of the two ear-apertures of the same, it being only necessary that the wooden casing or exterior to the vessel should be of such a size as to tightly fit about the vessel, both on its sides and ends, without the use of packing or stuffing of any kind.

From the above description it is obvious that when desired to remove the contents of the metallic vessel it is only necessary to first detach the cap from its spout, when, removing its cork or stopper, communication is had with its interior without removing any portion of the wooden casing or exterior, the vessel afterward being closed by simply replacing the stopper and the said cap, if desired, the importance of which, as well as its desirability and many advantages as a packing for metallic vessels, are manifest, among which, however, may be here mentioned its economy in labor over the ordinary packing-box for such vessels. No stuffing or packing is necessary to secure the safety of the vessel and its contents in transportation, and less expense is incurred in freighting by cars or otherwise than with the ordinary packing.

When the above combined vessel and casing is large in size it might be desirable to strengthen the casing by surrounding it with hoops; but in most cases I do not deem it necessary.

Having thus described my invention, what I claim as my invention, and desire to secure by Letters Patent, is—

1. So constructing a casing that when the can is inclosed therein the handle of the can will serve for both.

2. The top I, with its openings $x\ x$ to receive the lugs E E of the can, constructed and arranged in the manner and for the purpose herein specified.

JOHN W. MASURY.

Witnesses:
ALBERT W. BROWN,
M. M. LIVINGSTON.